US009392325B2

(12) United States Patent
Bangma et al.

(10) Patent No.: US 9,392,325 B2
(45) Date of Patent: Jul. 12, 2016

(54) METHOD OF PROCESSING AN ELECTRONIC SERVICE GUIDE AND ELECTRONIC SERVICE GUIDE BROADCASTER

(75) Inventors: Menno Remco Bangma, The Hague (NL); Edsger Jan Jager, Delft (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 644 days.

(21) Appl. No.: 12/989,338

(22) PCT Filed: Apr. 17, 2009

(86) PCT No.: PCT/EP2009/002845
§ 371 (c)(1),
(2), (4) Date: Oct. 22, 2010

(87) PCT Pub. No.: WO2009/129971
PCT Pub. Date: Oct. 29, 2009

(65) Prior Publication Data
US 2011/0041065 A1     Feb. 17, 2011

(30) Foreign Application Priority Data

Apr. 23, 2008 (EP) .................... 08007831

(51) Int. Cl.
H04N 21/23 (2011.01)
H04N 21/435 (2011.01)
H04N 21/235 (2011.01)
H04N 21/262 (2011.01)
H04N 21/414 (2011.01)
H04N 21/434 (2011.01)
H04N 21/45 (2011.01)
H04N 21/454 (2011.01)

(Continued)

(52) U.S. Cl.
CPC ........... *H04N 21/435* (2013.01); *H04N 21/235* (2013.01); *H04N 21/26283* (2013.01); *H04N 21/41407* (2013.01); *H04N 21/4345* (2013.01); *H04N 21/4358* (2013.01); *H04N 21/454* (2013.01); *H04N 21/4516* (2013.01); *H04N 21/4621* (2013.01); *H04N 21/482* (2013.01)

(58) Field of Classification Search
None
See application file for complete search history.

(56) References Cited

U.S. PATENT DOCUMENTS

2006/0053450 A1    3/2006  Saarikivi et al.
2007/0113246 A1*   5/2007  Xiong ............................ 725/39
2009/0185522 A1*   7/2009  Periyalwar et al. ........... 370/328

FOREIGN PATENT DOCUMENTS

WO    WO2006/072825    7/2006

OTHER PUBLICATIONS

Philipp Steckel, Mobile Broadcasting: Advance Service using Innovative Electronic Service Guide, Mar. 3, 2008.*

(Continued)

*Primary Examiner* — Cai Chen
(74) *Attorney, Agent, or Firm* — McDonnell Boehnen Hulbert & Berghoff LLP

(57) ABSTRACT

The invention relates to a method of processing an electronic service guide in a terminal. The terminal is configured for receiving an electronic service guide over a network. The method involves receiving the electronic service guide by the terminal over the network. The terminal has a first capability status. The electronic service guide is processed by the terminal in dependence of the first capability status of the terminal.

17 Claims, 4 Drawing Sheets

(51) Int. Cl.
*H04N 21/462* (2011.01)
*H04N 21/482* (2011.01)

(56) References Cited

OTHER PUBLICATIONS

Service Guide for Mobile Broadcast Services, 2005.*
Steckel, Philipp, "Mobile Broadcasting: Advanced Services Using Innovative Electronic Service Guides", Broadband Multimedia Systems and Broadcasting, 2008 IEEE International Symposium on, Mar. 31, 2008, pp. 1-6.
Allamandri, Fabio et al., "Service Platform for Converged Interactive Broadband Broadcast and Cellular Wireless", IEEE Transactions on Broadcasting, vol. 53, No. 1, Mar. 1, 2007, pp. 200-211.
IP Datacast Over DVB-H: Electronic Service Guide (ESG); DVB Document, vol. A099, Nov. 1, 2005, pp. 49-70.
PCT International Search Report, PCT International Application No. PCT/EP2009/002845 dated Aug. 21, 2009.
OMA (Open Mobile Alliance) "Service Guide for Mobile Broad-cast Services", Draft Version 1.0—Sep. 30, 2005, pp. 1-64.

* cited by examiner

METHOD OF PROCESSING AN ELECTRONIC SERVICE GUIDE AND ELECTRONIC SERVICE GUIDE BROADCASTER

CROSS REFERENCE TO RELATED APPLICATIONS

The present application is a national stage entry of PCT/EP2009/002845, filed on Apr. 17, 2009, and claims priority to European Patent Application EP 08007831.4, filed in the European Patent Office on Apr. 23, 2008, the entire contents of both of which are incorporated herein by reference.

FIELD OF THE INVENTION

The invention relates to the field of electronic service guides. More specifically, the invention relates to a method of processing an electronic service guide in a terminal configured for receiving said electronic service guide over a network. The invention also relates to a computer program for executing such a method, to a terminal comprising an electronic medium for executing such a program and to an electronic service guide broadcaster.

BACKGROUND OF THE INVENTION

Within the next few years multiple service providers will offer audiovisual and data services to mobile devices via terrestrial and satellite based broadcast, multicast and unicast networks, such as DVB-H, T-DMB, ISDB-T, DAB-IP, MBMS, HSDPA, WLAN etc. Such services are generally known as Mobile TV services, where audiovisual content and files are distributed via a point-to-multipoint and point-to-point network to mobile end-user devices. Mobile end-user devices, can be configured for receiving content via various networks, such as DVB-H, T-DMB, ISDB-T, DAB-IP, MBMS, HSDPA, WLAN etc.

The description of the contents of such services is typically available in a so called Electronic Service Guide (ESG). Such an ESG functions as the entry-point for the terminal to all services that are available on the broadcast channel or interactive channel.

The ESG comprises ESG data relating to the service and structure. ESG data include service information data containing a program guide (metadata including e.g. title, description, genre, time of a particular program), subscription and billing information (price, URL to acquire the proper credentials required to consume the service), access method information (SDP's, IP addresses, MPEG2-TS PIDs etc), interactivity information (e.g. voting or gambling) and auxiliary data. The service information data, often structured in tables, provides information of the content service (audio, video and/or files). The content service can then be received using the ESG.

As a result of the diversity in the capabilities of terminals, the service descriptions for all audiovisual and data services may not be applicable for all terminals. Diversity in capabilities exists e.g. in capabilities relating to access networks supported by the terminal, processing capabilities of audiovisual media codecs, security capabilities etc. As an example, a first terminal may be configured for receiving and processing audiovisual content provided over a WLAN network, HSDPA network and DVB-H network, whereas another terminal is only capable of receiving said same data over a HSDPA network.

The OMA (Open Mobile Alliance) document "Service Guide for Mobile Broadcast Services", candidate version 1.0 of Sep. 25, 2007 prescribes the use of 'Access' fragments indicating how a terminal can access a service or a schedule during the lifespan of the 'Access fragment'. The 'Access fragment' may contain an element referred to as 'TerminalCapabilityRequirement'. This element provides a hint to the terminal what is needed to consume the service after the ESG has been downloaded completely. Furthermore, if a capability status of a terminal is changed, the implications of the changed capability status are not immediately clear for the ESG.

There exists a need in the art for an improved method of processing an ESG in a terminal, in particular in relation to the efficiency in obtaining an ESG as to improve performance.

SUMMARY OF THE INVENTION

A method of processing an electronic service guide in a terminal is proposed. The terminal is configured for receiving an electronic service guide over a network. The method involves receiving the electronic service guide by the terminal over the network. The terminal has a first capability status. The electronic service guide is processed by the terminal in dependence of the first capability status of the terminal.

Also, a computer program for processing an electronic service guide of a terminal is proposed. The terminal is configured for receiving an electronic service guide over a network. The program comprises software code portions, when run by a processor, being adapted for receiving the electronic service guide by the terminal over the network. The terminal has a first capability status. The electronic service guide is processed by the terminal in dependence of the first capability status.

Furthermore, an electronic medium containing such a computer program and a terminal containing such an electronic medium is proposed.

Finally, an electronic service guide broadcaster is proposed. The broadcaster is configured for broadcasting an announcement channel comprising data concerning one or more service guide fragments of the electronic service guide. The data comprise terminal capability requirements associated with the service guide fragments.

By processing the electronic service guide in dependence on the terminal capability status, only those parts of the ESG are used (e.g. retrieved or rendered) that are relevant in view of the terminal capability status. The ESG presented to the user only contains information relating to services that can be accessed and/or processed in accordance with this status. Furthermore, by taking account of the terminal capability status, the terminal does not need to acquire the complete ESG but only the part relevant in view of the terminal capability status.

The dependence of the electronic service guide on the capability status of the terminal provides for further advantages. As an example, if the capabilities of a terminal are changed (e.g. due to the insertion of a WLAN module in the terminal), the implications for the ESG are immediately clear. The terminal then 'knows' what additional parts of the ESG are required and can obtain these additional ESG parts subsequently.

It should be appreciated that the capability status may comprise at least one of the static and dynamic capabilities of the terminal. Static capabilities comprise the capabilities that are available by default (and that will normally not be changed during normal use of the terminal). Dynamic capabilities include capabilities that can be changed by the user, the network operator or otherwise. Capabilities can be changed by changing the hardware- and/or software configuration of the terminal. As an example, the software of the terminal may be updated automatically (e.g. a codec update) resulting in a different capability status. In another example, the capabilities may be changed automatically, e.g. by automatically disabling W-LAN connections without intervention of the user. Capabilities may also be changed by using options available in the software to switch on/off a capability or to define user-preferred capabilities.

The embodiment as defined in claim 2 takes account of the wide diversity of distribution network support capabilities amongst the terminal population by processing the electronic service guide in accordance with the access capabilities of each individual terminal. The distribution network support capability indicates the access network(s) supported by the terminal. As an example, a first terminal capable of accessing one or more services via a first access network and a second access network will provide an electronic service guide with services available via the first and second access network. On the other hand, a second terminal capable of accessing one or more service via said first access network only will only provide an electronic service guide corresponding to services available via the first access network.

Distribution network support capabilities include frequency ranges available for a terminal to access a particular distribution network The embodiment as defined in claim 3 takes account of the wide diversity of processing capabilities amongst the terminal population by processing the electronic service guide in accordance with the processing capabilities of each individual terminal. Examples of such processing capabilities include the elements 'Video', 'Audio', and 'DownloadFile'. These elements describe the capabilities of the video codec, the audio codec and the capability to download files. The capabilities relate e.g. to the bit rate of a video stream, the resolution of the video and to the minimum buffer size of the decoder to process the video or audio content. As an example, a first terminal having a first processing capability (e.g. first bit rate) will be capable of providing an electronic service guide corresponding to the first processing capability of the terminal, whereas a second terminal with a second processing capability will provide an electronic service guide corresponding to the second processing capability of the terminal.

The embodiment of claim 4 provides the advantage that the terminal does not need to acquire the complete electronic service guide by filtering the electronic service guide in accordance with the capability status of the terminal. The embodiment of claim 5 facilitates use of the electronic service guide by only displaying the services available for the applicable status of the terminal capabilities.

The embodiment of claim 6 takes account of the change of the terminal capability status, e.g. by the addition of hardware, the execution of particular software, changed settings by the user or combinations thereof. As a consequence, another ESG may be required taking account of the changed capability status. The new electronic service guide may e.g. be obtained by tuning to an announcement channel in response to detecting the change of the terminal capability status.

The embodiments of claims 7 and 8 provide for an efficient manner of distributing the electronic service guide enabling terminals to use only those parts of the service guide that are relevant in view of the terminal capability status.

The embodiment of claim 15 provides for an efficient manner of providing ESG information to a terminal over one network, whereas the ESG information applicable relates to service available via a plurality of access networks.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
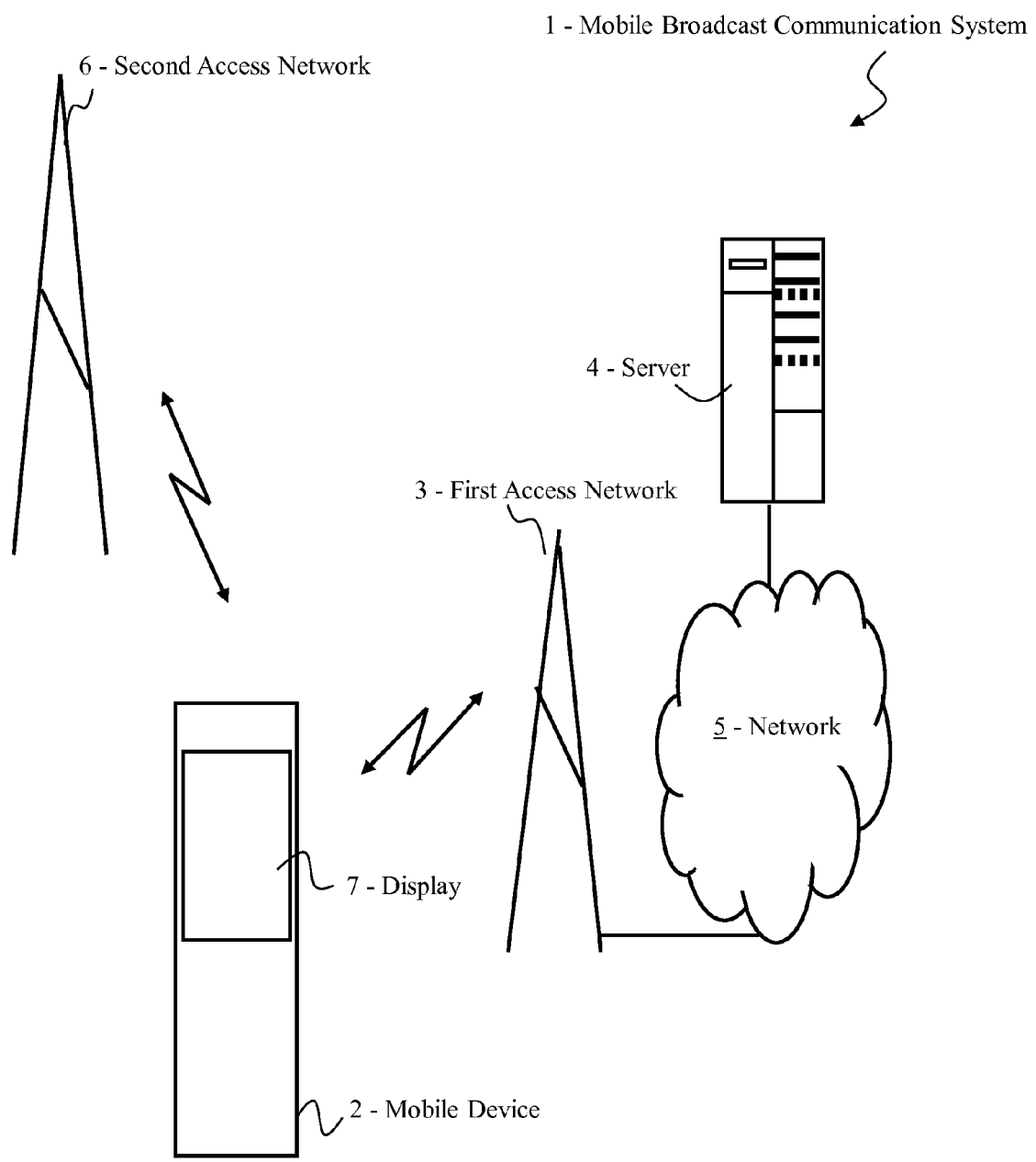
FIG. 1 shows a schematic illustration of a communication system.

In FIG. 1, a mobile broadcast communication system 1 (e.g. a television broadcast system or a file distribution system) is shown, wherein a mobile device 2 has mobile access to a first access network 3 connected to a server 4 via a network 5. The mobile device 2 is also capable of connecting to a second access network 6.

The mobile device 2, described in further detail with reference to FIG. 3, may e.g. be a mobile phone, a personal digital assistant (PDA), a portable computer (laptop) etc. The mobile device has a display 7 for displaying an electronic service guide (ESG).

The networks 3, 6 are networks capable of providing mobile broadcast services to the mobile device 2. The network may e.g. comprise a DVB-H, T-DMB, ISDB-T, DAB-IP, MBMS, HSDPA, WLAN etc. network.

The server 4 in FIG. 1 may represent a plurality of servers. The server 4 provides the ESG data via the network 5 and the first access network 3 to the mobile device 2. The content service selectable in the ESG on the display 7 may originate from a different server. The mobile device 2 may be capable of receiving the ESG over the first access network 3 and subsequently access a service, called via the ESG, via the second access network 6.

Figure 2:
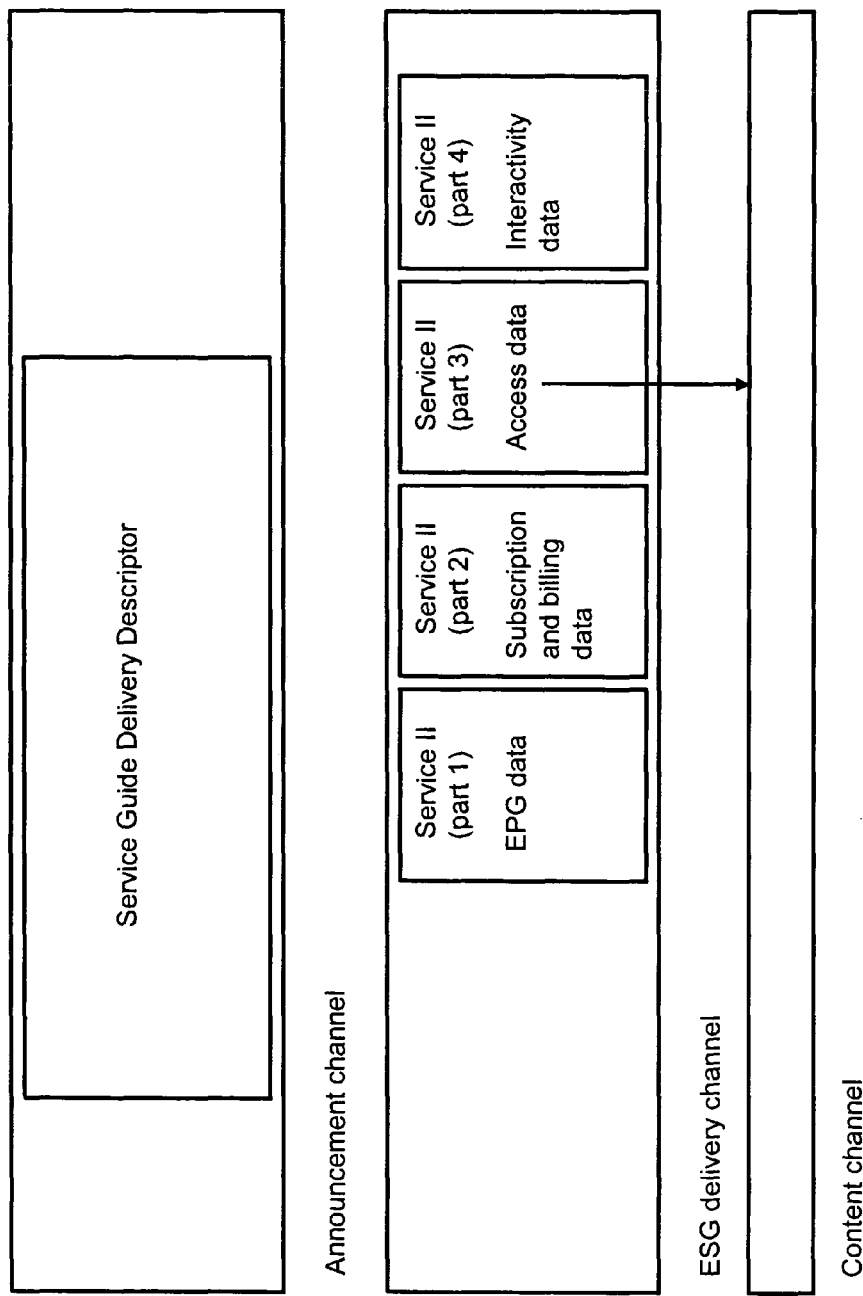
FIG. 2 shows an example of an announcement channel and a service guide delivery channel.

The ESG data provided to the mobile device 2 may be transmitted, e.g. by broadcasting or over an interactive channel, over the network 3 in a manner shown in FIG. 2.

Typically, the ESG data are separated into ESG fragments or ESG containers and put on a service guide delivery channel. The structure of the ESG and the addresses of the containers are announced on the announcement channel. The announcement channel itself can typically be found on a fixed or predefined address or identifier, such as a fixed IP address, or a fixed PID number on a MPEG2 transport stream. Further information on the manner of providing ESG data can be found in the OMA (Open Mobile Alliance) document "Service Guide for Mobile Broadcast Services", candidate version 1.0 of Sep. 25, 2007, which is incorporated in the present application by reference in its entirety.

In FIG. 2, the announcement channel announces the existence of three services I, II and III in corresponding delivery descriptors. The service information for each service is stored in four ESG data containers (delivery units or fragments) of the ESG delivery channel, the address of which is declared on the announcement channel. The first container contains the electronic program data (e.g. name, description, start time, end time etc.), the second container contains the subscription and billing data (price, contact address for purchase etc.), the third container contains the access data (access address, access parameters) and the fourth container contains the interactivity data. It should be appreciated that the ESG data may be organized differently in the ESG containers; the electronic program data may e.g. be distributed over various containers. The access data of the third container provide the required information for tuning to the content channel of FIG. 2, indicated by the arrow. As mentioned previously, the access data may point the mobile device 2 to a service available via a different access network.

The announcement channel and/or the ESG delivery channel may comprise information about the terminal capability requirements required for processing (a part of) the ESG.

The announcement channel comprises a Service Guide Delivery Descriptor (SGDD) instantiated as an XML document. The SGDD comprises an element "DescriptorEntry" defining an entry of the SGDD. The "DescriptorEntry" element comprises a "GroupingCriteria" element. This element specifies the criteria for grouping service guide fragments for a particular "DescriptorEntry" element. If several criteria for grouping are present at the same time, all those grouping criteria apply. Known grouping criteria element are "TimeGroupingCriteria", "GenreGroupingCriteria", "BSMSelector" and "ServiceCriteria".

Another element of the "DescriptorEntry" element is "Service Guide Delivery Unit". This unit comprises a group of fragments. It should be noted that the "GroupingCriteria" may be present as an element of the "DescriptorElement" entry or as an element of a fragment assigning the "GroupingCriteria" to a particular fragment.

In an embodiment of the invention, a further "GroupingCriteria" element comprises a "TerminalCapability" element. The "TerminalCapability" element defines the required capabilities for processing the service guide fragments for a particular "DescriptorEntry".

The broadcaster server 4 of FIG. 1 is configured for providing such an announcement channel.

Figure 3:
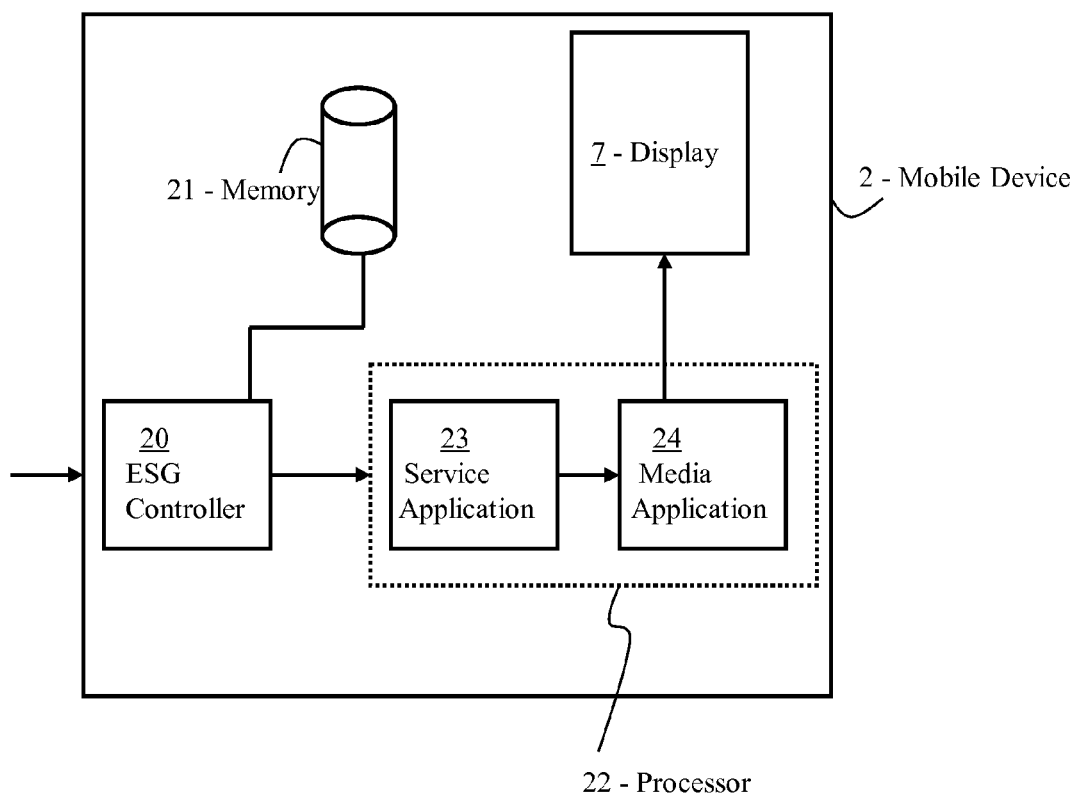
FIG. 3 shows a schematic illustration of a mobile device.

FIG. 3 is a schematic illustration of a mobile device 2 according to an embodiment of the invention.

The mobile device 2 contains an ESG controller 20, a memory 21 and a processor 22 capable of executing a service application 23 and a media application 24. The ESG controller 20 is configured to receive the announcement channel of FIG. 2 and to filter ESG data on the basis of the capability status of the mobile device 2. The memory 21 contains the capability status of the mobile device 2. The terminal capability status may indicate the distribution network(s) supported by the mobile device 2 and/or the processing capability of the mobile device 2. The media application is adapted for rendering media, including the ESG, on the display 7 of the mobile device 2.

It should be appreciated that the capability status may comprise at least one of the static and dynamic capabilities of the mobile device 2. Static capabilities comprise the capabilities that are available by default (and that will normally not be changed during normal use of the terminal). Dynamic capabilities include capabilities that can be changed by the user, network operator or otherwise. Capabilities can be changed by changing the hardware- and/or software configuration of the mobile device 1. An example includes the provision of a Wifi add-on card to the mobile device 2 such that the mobile device is capable of accessing a Wifi access network afterwards. Capabilities may also be changed by using options available in the software to switch on/off a capability or to define user-preferred capabilities. An example includes (temporarily) disabling the possibility of setting up a Wifi connection.

Figure 4:
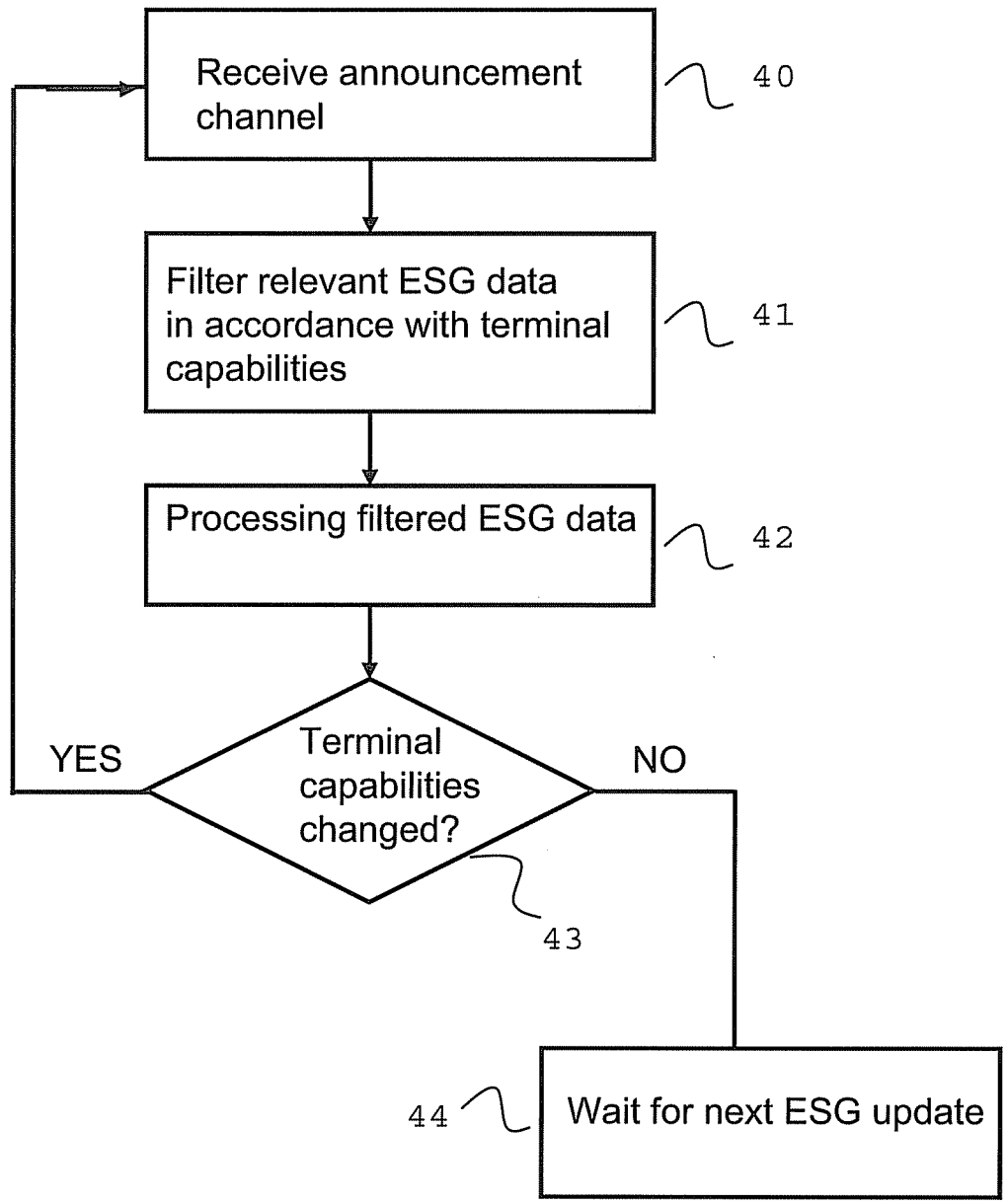
FIG. 4 shows a flow chart according to an embodiment of a method to be performed in the mobile device of FIG. 3.

An embodiment of the operation of the mobile device 2 will now be described with reference to FIG. 4. It will be assumed that the mobile device is capable of accessing a UMTS network 3 and a DVB-H network 6. This capability status is stored in the memory 21.

In step 40, the mobile device 2 is tuned to the announcement channel of FIG. 2 provided over the UMTS network 3. The announcement channel is transmitted by the broadcaster server 4 and received by the ESG controller 20 of the mobile device 2.

The SGDD of the announcement channel provides a plurality of "DescriptorEntry" elements. These elements comprise one or more "GroupingCriteria" elements including "TerminalCapability" elements. For example, the announcement channel has a first "DescriptorEntry" element for ESG fragments available over a HSDPA network, a second "DescriptorEntry" element for ESG fragments available over the UMTS network 3 and a third "DescriptorEntry" element for ESG fragments available over the DVB-H network 6. Of course, the "TerminalCapability" element may also define a set of access networks over which ESG fragments are available. Furthermore, multiple "GroupingCriteria" elements may apply for a particular "DescriptorEntry" element.

In step 41, the ESG controller 20 filters the data received over the announcement channel in dependence on the capability status of the mobile device 2 as stored in memory 21. In the present case, the part of the ESG (as identified by the "TerminalCapability" element) not corresponding to the capability status of the mobile device 2 (here, the first "DescriptorElement") is filtered out of the ESG. It should be noted that the ESG data, although received over the UMTS network 3, may (also) relate to services available over the DVB-H network 6.

In step 42, the filtered ESG information is further processed, e.g. stored and displayed on the display 7 of the mobile device 2.

In step 43, it is checked whether the terminal capabilities of the mobile device have been changed. The change is reflected in the terminal capability status stored in the memory 21. In the present example, it is assumed that the mobile device has acquired the capability of accessing DVB-SH networks.

If the terminal capabilities have not been changed, the ESG is updated in accordance with the next scheduled update. If the terminal capabilities have been changed, the ESG controller 20 may receive the ESG earlier than scheduled. This may occur as a result of the mobile device 2 requesting the ESG over an interactive network in response to detecting the change of terminal capability. Alternatively, the ESG controller 20 only tunes to the announcement channel and waits for the next ESG update at step 44.

The newly received ESG is now processed again in step 41. As a result of the capability of the mobile device 2 for accessing DVB-SH networks, the ESG data relating to the first "DescriptorEntry" is now processed by the mobile device 2.

It should be appreciated that the filtering step is not necessary and that instead, the complete ESG is stored in the mobile device 2. The processing of the ESG, e.g. the display of the ESG on the display 7, may then be dependent on the terminal capability status.

Also, apart from the network access capabilities, processing capabilities of the mobile device may be stored in the memory 21 of the mobile device 2. Examples of such processing capabilities include the elements 'Video', 'Audio', and 'DownloadFile'. These elements describe the capabilities of the video codec, the audio codec and the capability to download files. The capabilities relate e.g. to the bit rate of a video stream, the resolution of the video and to the minimum buffer size of the decoder to process the video or audio content. The "TerminalCapability" elements may define these processing capabilities for a particular "DescriptorEntry" element of the SGDD.

The invention claimed is:

1. A method of processing an electronic service guide in a terminal, the terminal having a first capability status stored in the terminal, the method comprising:
   the terminal first receiving an announcement channel transmitted to the terminal over a network, wherein the announcement channel comprises data announcing one or more service guide fragments of the electronic service guide available on a different service guide delivery channel, and wherein the data comprise terminal capability requirements and network addresses of the one or more service guide fragments;
   the terminal, after receiving data from the announcement channel, filtering the data from the announcement channel on the basis of the first capability status of the terminal stored in the terminal; and
   the terminal, after filtering data from the announcement channel, processing the service guide fragments from the service guide delivery channel according to the data from the announcement channel as filtered.

2. The method according to claim 1, wherein the first capability status is a distribution network support capability status defining one or more access networks the terminal is configured to connect to for receiving services and wherein filtering comprises removing portions of the data associated with access networks other than the defined one or more access networks.

3. The method according to claim 1, wherein the first capability status is a processing capability status defining one or more processing capabilities of the terminal for processing received services and wherein filtering comprises removing portions of the data associated with electronic services that do not meet the processing capabilities of the terminal.

4. The method according to claim 1, wherein filtering comprises removing data in order to obtain a reduced electronic service guide representing electronic services available at the terminal,
   and wherein the method further comprises processing the reduced electronic service guide.

5. The method according to claim 4, wherein the terminal comprises a display and further processing the reduced electronic service guide comprises displaying the reduced electronic service guide on the display.

6. The method according to claim 1, further comprising:
   changing the first capability status of the terminal to a second capability status different from the first capability status;
   receiving data announcing a second electronic service guide;
   filtering the data on the basis of the second capability status; and
   processing the second electronic service guide according to the data as filtered.

7. The method according to claim 1, further comprising receiving the terminal capability requirements in a grouping criteria element of the announcement channel, the grouping criteria element specifying one or more criteria for grouping the service guide fragments for an entry of the announcement channel.

8. A computer program product for processing an electronic service guide at a terminal, the terminal having a first capability status stored in the terminal, the program comprising software code portions that, when run by a processor, carry out functions including:
   the terminal first receiving an announcement channel transmitted to the terminal over a network, wherein the announcement channel comprises data announcing one or more service guide fragments of the electronic service guide available on a different service guide delivery channel, and wherein the data comprise terminal capability requirements and network addresses of the one or more service guide fragments;
   the terminal, after receiving data from the announcement channel, filtering the data from the announcement channel on the basis of the first capability status of the terminal stored in the terminal; and
   the terminal, after filtering data from the announcement channel, processing the service guide fragments from the service guide delivery channel according to the data from the announcement channel as filtered.

9. A terminal comprising:
   a processor;
   a network interface; and
   a memory storing the first capability status and comprising software code portions that, when run by the processor, carry out functions including:
   first receiving at the terminal an announcement channel transmitted to the terminal over a network, wherein the announcement channel comprises data announcing one or more service guide fragments of the electronic service guide available on a different service guide delivery channel, and wherein the data comprise terminal capability requirements and network addresses of the one or more service guide fragments;
   after receiving data from the announcement channel, filtering the data from the announcement channel on the basis of the first capability status of the terminal stored in the terminal; and
   after filtering data from the announcement channel, processing the service guide fragments from the service guide delivery channel according to the data from the announcement channel as filtered.

10. An electronic service guide broadcaster configured to broadcast an announcement channel to a terminal, wherein the announcement channel comprises data announcing one or more service guide fragments of the electronic service guide available on a different service guide delivery channel, wherein the data comprise network addresses of the one or more service guide fragments and terminal capability requirements associated with the service guide fragments, and wherein the terminal capability requirements provide the terminal with a basis to filter the data received from the announcement channel according to a capability status stored in the terminal.

11. The electronic service guide broadcaster according to claim 10, wherein the announcement channel comprises a grouping criteria element specifying the terminal capability requirements for a group of the service guide fragments for an entry of the announcement channel.

12. The electronic service guide broadcaster according to claim 10, wherein the announcement channel is transmitted over a first access network and the service guide fragments relate to services transmitted over a second access network, different from the first access network.

13. The computer program product of claim 8, wherein the first capability status is a distribution network support capability status defining one or more access networks the terminal is configured to connect to for receiving services and wherein the processing comprises filtering the electronic service guide to remove portions of the guide associated with access networks other than the defined one or more access networks.

14. The computer program product of claim 8, wherein the first capability status is a processing capability status defining one or more processing capabilities of the terminal for processing received services and wherein the processing comprises filtering the electronic service guide to remove portions of the guide associated with electronic services that do not meet the processing capabilities of the terminal.

15. The computer program product of claim 8, wherein filtering comprises removing data in order to obtain a reduced electronic service guide representing electronic services available at the terminal,
   and wherein the functions further include processing the reduced electronic service guide.

16. The computer program product of claim 15, wherein processing the reduced electronic service guide comprises causing the reduced electronic service guide to be displayed on a display of the terminal.

17. The computer program product of claim 8, wherein the functions further include:
   changing the first capability status of the terminal to a second capability status different from the first capability status;
   receiving data announcing a second electronic service guide;
   filtering the data on the basis of the second capability status; and
   processing the second electronic service guide according to the data as filtered.

* * * * *